(12) United States Patent
Stinga et al.

(10) Patent No.: US 8,637,119 B2
(45) Date of Patent: Jan. 28, 2014

(54) FILM HAVING WATER, GREASE, GAS AND WATER VAPOR BARRIER PROPERTIES

(75) Inventors: Nicoleta Camelia Stinga, Grenoble (FR); Daniel Samain, Saint Martin d'Here (FR); David Guerin, Chamaliere (FR)

(73) Assignees: Centre Technique du Papier, Gieres (FR); Centre National de la Recherche Scientifique (CNRS), Paris (FR)

( * ) Notice: Subject to any disclaimer, the term of this patent is extended or adjusted under 35 U.S.C. 154(b) by 524 days.

(21) Appl. No.: 12/810,718

(22) PCT Filed: Dec. 22, 2008

(86) PCT No.: PCT/EP2008/068145
§ 371 (c)(1),
(2), (4) Date: Oct. 5, 2010

(87) PCT Pub. No.: WO2009/083525
PCT Pub. Date: Jul. 9, 2009

(65) Prior Publication Data
US 2011/0014458 A1 Jan. 20, 2011

(30) Foreign Application Priority Data
Dec. 26, 2007 (FR) .................................. 07 60355

(51) Int. Cl.
*B05D 3/02* (2006.01)
(52) U.S. Cl.
USPC ........... 427/384; 427/350; 427/351; 427/394; 427/430.1; 427/439; 428/336; 428/500; 428/507
(58) Field of Classification Search
None
See application file for complete search history.

(56) References Cited

U.S. PATENT DOCUMENTS 3,934,587 A * 1/1976 Gordon .......................... 604/364
6,531,196 B1 3/2003 Aho et al.

FOREIGN PATENT DOCUMENTS

| EP | 0 545 228 A1 | 6/1993 |
| FR | 693803 | 11/1930 |
| WO | WO 96/16799 A1 | 6/1996 |
| WO | WO 00/50492 A1 | 8/2000 |

OTHER PUBLICATIONS

Gao Jun, Lei Jingxin, Li Xungang. Esterification of Polyvinyl Alcohol with Stearic Acid and Properties of Esterification Product; Acta Polymerica Sinica, 2001, 1(1): 118-119.*
Arranz et al.; Partial Esterification of Poly(Vinyl Alcohol) with Acid Chlorides; Die Angewandte Makromolekulare Chemie; vol. 92 (1980) pp. 121-131.*
Merck Index Entries for PVA and Stearic Acid; Retrieved from http://themerckindex.cambridgesoft.com/themerckindex/Forms/Home/ContentArea/Home.aspx on May 13, 2013.*
Schuman et al.; Coating of Surface-Modified Papers with Poly(Vinyl Alcohol); Surface & Coatings Technology; vol. 183 (2004), pp. 96-105.*
Mowiol Polyvinyl Alcohol, Kuraray Specialties Europe KSE GmbH, Frankfury/Main Germany, Jun. 2003.

(Continued)

*Primary Examiner* — Timothy Meeks
*Assistant Examiner* — Michael P Rodriguez
(74) *Attorney, Agent, or Firm* — Birch, Stewart, Kolasch & Birch, LLP

(57) ABSTRACT

Film having liquid-water, grease, gas and water-vapor barrier properties, comprising a PVA film grafted on the surface with a fatty acid.

7 Claims, 6 Drawing Sheets

(56) References Cited

OTHER PUBLICATIONS

Figure 1:
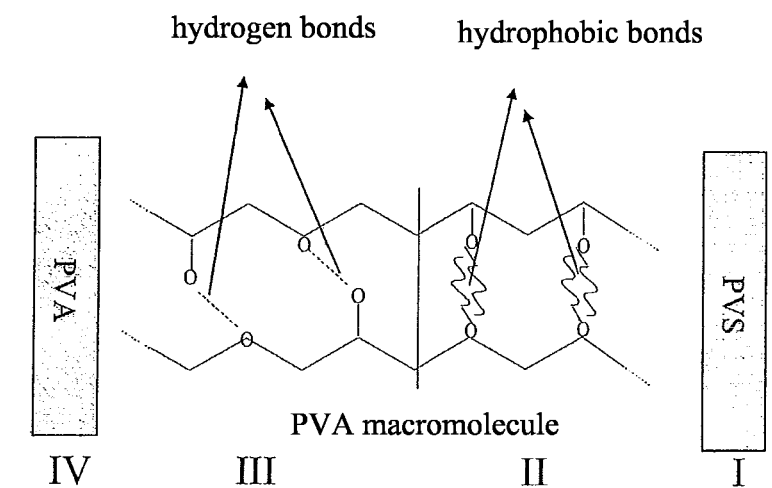
Figure 1:
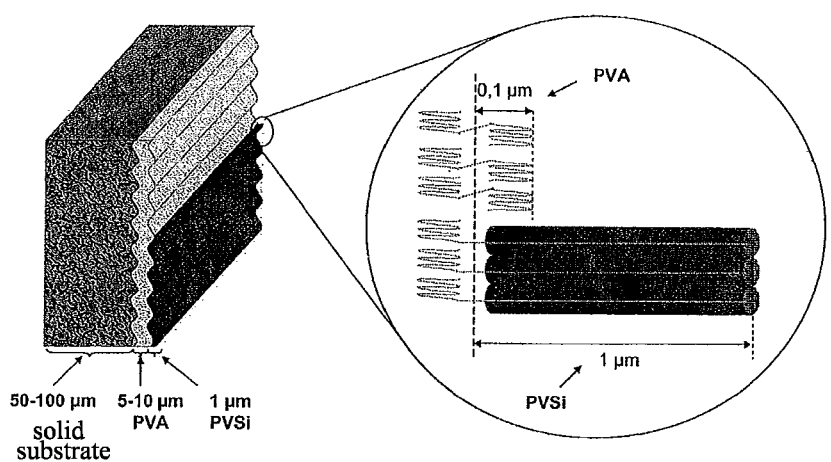

Biver et al., "Microphase Separation and Wetting Properties of Palmitate-graft-poly(vinyl alcohol) Films", Macromolecules, 2002, vol. 35, pp. 2552-2559, XP-002479530.
International Search Report dated Mar. 3, 2009, for International Application No. PCT/EP2008/068145.
Freire et al., "Controlled Heterogeneous Modification of Cellulose Fibers with Fatty Acids: Effect of Reaction Conditions on the Extent of Esterification and Fiber Properties", J. of Applied Polymer Science, vol. 100, 2006, pp. 1093-1102.
Jayaraman et al., "Versatile Multilayer Thin Film Preparation Using Hydrophobic Interactions, Crystallization, and Chemical Modification of Poly(vinyl alcohol)", Langmuir, vol. 23, No. 6, 2007, pp. 3260-3264.
Kozlov et al., "Adsorption and Chemistry of Ultra-Thin Films of Polyvinyl Alcohol for Sensor Development", Polymer Reprints, vol. 44, No. 2, 2003, pp. 283-284.
Kwatra et al., "Synthesis of Long Chain Fatty Acids Esterified onto Cellulose via the Vacuum-Acid Chloride Process", Ind. Eng. Chem. Res., vol. 31, No. 12, 1992, pp. 2647-2651
Vallette et al., "Improvement of Adhesion and Other Properties by Chemical Treatment", XVI Conference, No. 22, 1976, pp. 1-19.

\* cited by examiner a)

b)

a)

b)

c)

FILM HAVING WATER, GREASE, GAS AND WATER VAPOR BARRIER PROPERTIES

This invention relates to a film with water, grease, gas and water vapor barrier properties as well as the processes for obtaining same. This film may be formed at the surface of a wide variety of substrates in order to modify the barrier properties thereof. For certain applications, in particular in the field of food packaging, the film with barrier properties is formed on cellulosic substrates such as paper or cardboard.

Currently, barrier packagings (barriers to gases, aromas) are the result of various assemblies: cardboard papers, aluminum, synthetic films. Plastic packagings offer highly variable barrier properties according to the nature of the polymer used. To develop more effective barrier properties, surface treatments such as metallization or vacuum deposition of aluminum oxides and silicon oxides are sometimes produced.

If reference is made to the processes of production thereof, there are three paper/cardboard packaging categories: parchment paper, complexes, and coated papers/cardboards.

Parchment paper or vegetable parchment paper offers an excellent barrier to grease, average resistance to water, good resistance to heat, but a moderate barrier to gases and aromas.

Complexes combine a plurality of materials with complementary properties: paper/cardboard (barrier to light, printability, mechanical properties: rigidity, folding . . . ), aluminum (barrier to everything, folding memory), polymer (barrier (gas, water vapor, aromas . . . ), heat-sealability (PE)). These combinations are produced offline by extrusion coating or lamination. The main disadvantages of complexes are associated with the difficulties of extrusion of certain polymers, the possible presence of solvent and the cost thereof due to the performance of these operations on offline machines with little flexibility and low productivity. Moreover, these products do not have high biodegradability.

Coated papers/cardboards are produced by depositing an aqueous dispersion of barrier products on on-line machines. There are numerous processes for depositing these aqueous dispersions. The products deposited belong to three categories: waxes, fluorinated products and aqueous polymer dispersions. Waxes (paraffin, microcrystalline wax, mixtures) offer excellent barriers to water, but moderate barriers to grease and water vapor. Waxes are inexpensive, impart rigidity on the substrate and are heat-sealable, but they have low folding resistance, low heat resistance, and are non-biodegradable and difficult to recycle. Fluorinated products can be introduced into the mass of the paper or deposited at the surface. They offer excellent barriers to grease, but moderate barriers to water and poor barriers to gases. These products moreover are not heat-sealable and can present health problems (presence of fluorinated by-products capable of migrating into the food). Aqueous polymer dispersions involve numerous polymers, and are intended to create a physical barrier (unlike fluorinated products, which offer a chemical barrier). The thicker the deposited film, after drying, is, and the fewer defects it has, the better this physical barrier is.

In addition, it is possible to modify the surface properties of a carrier material, on the surface of same, with reaction-inducing functions, by chemical grafting between the latter and reactive molecules. The chemical reaction between long-chain fatty acids (for example, acid chlorides) activated with hydroxyl functions located at the surface of solid materials is thus known. This operation can be performed by classic chemistry techniques in the heterogeneous solid-liquid phase (Nathanson A., 1930, Kwatra H. S. and Caruthers J. M., 1992; Vaca Garcia C. et al., 2000; Freire C. S. R. et al., 2006) or by the chromatogenic chemistry technique in the heterogeneous solid-liquid/vapor phase. In all cases, an ester bond forms between the fatty acid and the hydroxyls of the surface, which then become hydrophobic. As the reaction takes place in the heterogeneous phase, it is normally impossible to graft all of the hydroxyl functions of the material, in particular those that are located closest to the core.

The grafting of fatty acids on cellulosic materials by chromatogenic chemistry techniques was described in EP 1007202. The partial nature of the reaction is clearly visible on the infrared spectra produced in ATR (attenuated total reflection), in which both the presence of ester functions due to the grafting of fatty acids and the presence of non-derivative hydroxyl functions is clearly shown. From a functional perspective, the materials treated clearly have beneficial hydrophobic properties, but do not at all have grease or gas barrier properties.

In addition, it is known that gas and grease barrier properties can be obtained by PVA (polyvinyl alcohol) coating. Its hydrophilic and film-forming nature makes polyvinyl alcohol an excellent barrier to oils, grease and organic solvents. Similarly, it is characterized by low permeability to gases and to water vapor, as well as by complete transparence. Owing to its hydrophilic character, it adheres very well to cellulose and to polar surfaces. It nevertheless has a certain amphiphilic character that enables it also to be adsorbed on hydrophobic surfaces. Its film-forming character, its barrier properties and its capacity to work as a binding agent have led to a variety of uses thereof in paper and cardboard production. When paper requires more higher-performing properties than those offered by starch, polyvinyl alcohol is applied at the surface, to confer resistance, barrier properties and surface properties such as printability, softness and glossiness, but also to control the porosity of the paper. The resistance conferred by polyvinyl alcohol enables some of the cellulosic fibers to be replaced with mineral fillers or a larger amount of recycled fibers to be used, while maintaining the resistance and printability of the paper. It can be used alone or in combination with starch, or other additives, so as to improve the resistance to folding, tension, bursting or the optical and printability properties of the papers. This polymer therefore has very good film-forming properties and, in the absence of water, it has excellent grease and gas barrier properties. Unfortunately, these properties disappear once the material comes into contact with liquid water or even with water vapor under so-called tropical conditions (38° C. and 90% RH). PVA can therefore preserve its properties only when it is associated with water barrier films in complex assemblies (Mallory W., 1996). This means that these properties will be lost if the complex is washed with a solvent capable of solubilizing the water barrier film or if the complex is used at temperatures above the melting point of the water barrier film.

The chemical modification of polyvinyl alcohol (PVA) has also been developed to alter its chemical and/or physical properties and increase the use thereof. Chemically, polyvinyl alcohol is involved in all reactions specific to secondary alcohols: esterification, etherification, and so on. The most common chemical modification of polyvinyl alcohol is esterification, but polyvinyl esters can also be obtained by polymerization of vinyl esters. Esterification agents commonly used are: carboxyl acids and activated carboxyl acids such as acid chlorides or anhydrides. The esterification reaction of PVA with carboxyl acids is generally performed in the presence of a solvent or a catalyst.

Thus, the esterification of polyvinyl alcohol with fatty acid chlorides by means of solvent (dimethylformamide, N-methyl pyrrolidone, methyl ethyl ketone and toluene, pyridine, etc.) at low or high temperatures is well known.

However, these esterification reactions of PVA with fatty acids are not reactions of grafting and surface treatment of a PVA film to modify its barrier properties.

McCarthy and his team (Jayaraman K., Shaw Ling Hsu and McCarthy T. J., 2007, "Versatile multilayer thin film preparation using hydrophobic interactions, crystallization and chemical modification of poly(vinyl alcohol)", Langmuir, 23, 3260-3264 and Kozlov M. Quarmyne M., Chen W. and McCarthy T. J., 2003 "Adsorption and chemistry of ultra-thin films of polyvinyl alcohol for sensor development", Polymer Science and Engineering, 44(2). 283-284)) esterify polyvinyl alcohol, adsorbed in a thin layer on hydrophobic substrates, with short-chain carbonated fatty acid chlorides and at a low boiling point (heptafluorobutyric acid chloride, hexanoic and octanoic acid chlorides) in a vapor phase with yields of 35 to 90% according to the concentration of the PVA solution and the type of reagent. The PVA films used have a thickness of several nanometers and the esterification is performed in any thickness of the film. The objective pursued by these authors is to obtain multilayer films. These films do not have barrier properties, but are of interest in the development of sensors.

Biver et al. describe the chemical modification of PVA by palmitic acids in order to produce an amphiphilic material capable of being organized according to a two-part phase separation process, one being externally hydrophobic and the other being internally hydrophilic.

The reaction described by Biver et al. is conducted in a homogeneous phase in an N-methyl-2-pyrrolidone solvent in an inert atmosphere. The PVA is dissolved in this solvent, to which pyridine is added, and the reagent, palmitic acid chloride, is then added one drop at a time. After 16 hours of reaction at ambient temperature, the modified PVA is precipitated by ethylic ether and washed extensively to remove the solvent, the pyridine and the reagent not having reacted. The modified PVA including between 1.5 and 17% modification is then dissolved in DMO, which is evaporated under a nitrogen current to produce a an externally hydrophobic and internally hydrophilic amphiphilic material. According to the authors who studied it by 13C NMR, the distribution of ester groups is statistically significant. The product described by Biver et al. contains a statistical distribution of palmitic ester. Given that the maximum grafting rate is 17%, this means that, in this case, only one out of six hydroxyl groups is derived.

Biver et al. observe significant hysteresis of their product, which they attribute to a restructuring of the surface of the film. This restructuring is due to a very common phenomenon of rotational mobility. The grafted films that they obtain are initially hydrophobic because they are dried in air, which is a hydrophobic medium. When water is added, the hydrophobic properties of the surface of these films result in high contact angles. However, the system is then in a metastable energy configuration, and will seek to evolve toward a more stable configuration. This is possible by the rotation of PVA molecules in order to mask the grafted fatty acids and instead show OH groups. The more the molecules of the substrate are capable of rotational movements, the more sensitive this phenomenon naturally is. Thus, the water barrier properties of these materials will be weak and in particular decrease over time. The authors do not explicitly describe the water barrier properties of materials that they obtain, but it is possible to deduce them after the decrease in the contact angles over time, which they recorded.

A PVA derivative product, polyvinyl stearate (PVS), is also known, and can be obtained by esterification of polyvinyl alcohol or by polymerization of vinyl stearate. This material, which is a commercial product, does not however have all of the same properties as PVA, in the sense that it is instead highly lipophilic, and it is actually for this property that it is most often used. Owing to its lipophilic nature and its low melting temperature (~50° C.), it is used in particular as an oil texturizer.

Surprisingly, we have now shown that the coating of a substrate with PVA followed by draying and a surface-grafting treatment with a long-chain fatty acid chloride led to a substrate having water, grease, gas and water vapor barrier properties.

IR analysis by transmission performed on a pure PVA film subjected to grafting by stearic acid chloride shows that the PVA is clearly derived from the stearic acid chloride in such a way as to create ester functions, but the proportion thereof appears to be extremely low. It is therefore a phenomenon of chemical modification of the PVA, but which is quantitatively very limited. A second IR analysis was then performed in ATR on paper covered with a PVA film. The results show that, in an in-depth analysis of the ATR, which is similar, under our conditions, of a micron, the PVA is entirely substituted and the spectra obtained are superimposable on those of the commercial polyvinyl stearate. These results, which are different from those obtained in the grafting of cellulose and reported in patent EP 1007202, could have suggested that we had a PVS/PVA complex in which the barrier properties obtained would have been the result of the water barrier properties of the polyvinyl stearate and the grease and gas barrier properties of the PVA. Given that polyvinyl stearate is soluble in chloroform, we tested this hypothesis by performing an extensive washing, with this solvent, of papers covered with a PVA film and subjected to grafting by stearic acid chloride. The products obtained were analyzed, again, by IR/ATR and we observed surprisingly that the washing clearly removed a layer of polyvinyl stearate present at the surface of the material, but that it did not modify the appearance of the IR/ATR spectra or any of the water, grease or gas barrier properties. Even more surprisingly, we observed that these results were dependent on the chemical nature of the PVAs used, in particular their molecular weight and their de-acetylation rates. More specifically, we observed that, the more the PVAs had a low molecular weight and the more they contained residual acetate, the more they had a large layer of extractible PVS (all else being equal) and the less they had good barrier properties before and in particular after extraction by chloroform. Conversely, the PVA practically no longer containing acetate, and with a higher molecular weight, had only a small layer of PVS, and its barrier properties were practically unaffected by the washing. Similarly, we observed that the barrier properties and the amount of extractible PVS logically increased over the reaction time, but, surprisingly, distinctly according to the chemical nature of the PVAs. These results led us to formulate the following hypothesis.

The grafting of PVA films with long-chain fatty acid chlorides led to a material having four distinct compartments (FIG. 1). The structure of these compartments could be variable according to the working conditions and the chemical nature of the PVAs used.

These compartments are classified from I to IV from the exterior of the material to the interior.

IV) This consists of the PVS layer extractible by chloroform, i.e. PVA macromolecules entirely grafted with fatty acids.

II) This consists of a non-extractible PVS layer. These are PVA macromolecule segments grafted with fatty acids.

III) This is formed symmetrically by all of the non-grafted PVA segments.

IV) This is a completely non-grafted PVA layer.

Compartments II and III therefore consist of PVA molecules sequentially grafted with a fatty acid.

By sequential grafting, we mean grafting in which the PVA molecule consists of segments of variable sizes, which are alternately grafted and non-grafted. Compartment II consists of all of the grafted PVA segments and compartment III consists of all of the non-grafted PVA segments.

Another way to show the result of the grafting is to imagine the reaction of fatty acid chloride with the PVA layer as a front that moves from the exterior to the interior of the material.

Initially, before the reaction is begun, we of course have only compartment IV, pure PVA. The progression of the grafting front will then lead to the progressive and simultaneous formation of compartments II and III. Excessive progression will finally lead to the formation of compartment I.

In this schema, the actual barrier material is constituted by compartments II and III, which include the same PVA acromolecules, but consist of segments grafted on one side and non-grafted on the other. Compartment I is merely the result of excessive grafting, and, as we have seen, it is not necessary for obtaining barrier properties since it can be removed by washing without alteration of these properties. Compartment IV ensures the link with the substrate and is responsible for the surface homogeneity. Aside from this particular function, its thickness has no importance and it can be reduced to the minimum technologically possible.

This schema enables the surprising results obtained to be explained. As the actual barrier zone consists of the same macromolecules having segments grafted and non-grafted by fatty acids, the longer these macromolecules will be and the thicker the barrier zone will be, leading to a more effective barrier. Similarly, long macromolecules will be more difficult to extract than short ones, because these long molecules are more capable of having non-grafted segments. This aspect is presented especially well by the IR-ATR results on PVA 498 (PM 30,000) and PVA 2899 (PM 145,000), in which, after washing, a higher proportion of hydroxyls is seen on the PVA 498. This means a lower thickness of the active barrier layer. Logically, the barrier properties therefore are not as good with the 498. These two results are clearly consistent with a thicker barrier zone obtained with 2899.

Finally, the quality of the results obtained for the barrier properties will be dependent on the quality of the progression front of the reagent. This will be dependent on the initial grease and gas barrier properties of the material. Average barrier properties will lead to excessive and heterogeneous diffusion of the reagent in the entire thickness of the material. Therefore, there will simultaneously be a high rate of grafting associated with minor barrier properties.

When the substrate is a cellulosic material such as paper, it is possible to obtain barrier properties that are of particular interest in applications in the field of packaging and in particular food packaging.

DESCRIPTION OF THE INVENTION

The invention relates to a film having water, grease, gas and water vapor barrier properties including:
  a PVA film, in which the PVA has a molecular weight greater than 13,000 and a degree of hydrolysis greater than 81%,
  surface-grafted with a fatty acid having an aliphatic chain including at least 12 carbon atoms.

In a first embodiment, the film having water, grease, gas and water vapor barrier properties according to the invention includes:
  a PVA film, in which the PVA has a molecular weight greater than 13,000 and a degree of hydrolysis greater than 81%,
  a layer that is non-extractible with an organic solvent, including PVA molecules, having a molecular weight greater than 13,000 and a degree of hydrolysis greater than 81%, sequentially grafted with a fatty acid having an aliphatic chain including at least 12 carbon atoms.

In a second embodiment, the film having water, grease, gas and water vapor barrier properties according to the invention includes:
  a PVA film, in which the PVA has a molecular weight greater than 13,000 and a degree of hydrolysis greater than 81%,
  a layer that is non-extractible with an organic solvent, including PVA molecules, having a molecular weight greater than 13,000 and a degree of hydrolysis greater than 81%, sequentially grafted with a fatty acid having an aliphatic chain including at least 12 carbon atoms,
  a layer that is extractible with an organic solvent, including PVA molecules, having a molecular weight greater than 13,000 and a degree of hydrolysis greater than 81%, entirely grafted with a fatty acid having an aliphatic chain including at least 12 carbon atoms.

Preferably, the layer that is non-extractible with an organic solvent has a thickness of between 0.1 μm and 1 μm.

Preferably, the PVA film has a thickness greater than 0.05 μm.

Advantageously, the PVA has a molecular weight of 145,000.

In an advantageous embodiment, the PVA has a degree of hydrolysis of at least 87%.

Preferably, the fatty acid is a fatty acid having an aliphatic chain including 16 to 22 carbon atoms.

More preferably, the fatty acid is chosen from the group including stearic acid, palmitic acid and behenic acid.

The invention also relates to a substrate having a film with barrier properties according to the invention.

In a preferred embodiment, the substrate according to the invention consists of a cellulosic material.

The invention also relates to a process for forming a film, having water, grease, gas and water vapor properties, at the surface of a substrate including the following steps:
  coating of the substrate with PVA to form a PVA film at the surface of the substrate, in which the PVA has a molecular weight greater than 13,000 and a degree of hydrolysis greater than 81%;
  drying of the PVA film;
  grafting of at least one fatty acid having an aliphatic chain including at least 12 carbon atoms at the surface of the PVA film.

In a specific embodiment, the substrate is a cellulosic material and the process includes a step of calendaring after the step of drying the PVA film.

Advantageously, the coating enables a PVA film with a thickness greater than 0.1 μm to be deposited on the surface of the substrate.

In an advantageous embodiment of the invention, the grafting of the fatty acid is performed by esterification in the heterogeneous phase with a fatty acid chloride having an aliphatic chain including at least 12 carbon atoms.

Preferably, the fatty acid is a fatty acid having an aliphatic chain including 16 to 22 carbon atoms.

More preferably, the fatty acid is chosen from the group including stearic acid, palmitic acid and behenic acid.

In a preferred embodiment, the grafting is performed with stearic acid chloride.

The invention also relates to a film with barrier properties capable of being obtained by the process according to the invention.

The invention also relates to a substrate having a film with barrier properties capable of being obtained by the process according to the invention.

Finally, the invention also relates to a process for forming a film having water, grease, gas and water vapor barrier properties, on a support having, at the surface, a PVA film with a molecular weight greater than 13,000 and a degree of hydrolysis greater than 81%, comprising the grafting of a fatty acid having an aliphatic chain including at least 12 carbon atoms at the surface of the PVA film.

This invention therefore relates to a film with barrier properties and the processes for obtaining same.

By "film", we mean a layer of low thickness of a material. In practice, the thickness of a film is on the order of the µm to several tens of µm.

By "film with barrier properties", we mean a film of low thickness of a material conferring barrier properties on the substrate on which it is deposited.

By "barrier properties", we mean properties of insulation from water, grease, gas or water vapor, which characterize, for example, a packaging substrate.

By "water barrier properties", we mean the permeability to water as measured by the Cobb test. A value close to 0 shows that the film has good water barrier properties.

Preferably, the barrier films of the present invention have a Cobb value below 10 and preferably below 5.

By "grease barrier properties", we mean the resistance to grease as measured by the TAPPI method.

Preferably, the barrier films of the present invention have a grease resistance greater than 10 as measured by the TAPPI method/Kit test.

By "gas barrier properties", we mean the permeability to gases, oxygen, nitrogen, $CO_2$ and air. The lower the permeability to gases is, the better the gas barrier properties of the film are.

By "water vapor barrier properties", we mean the permeability to water vapor as measured according to standard ISO2528.

Preferably, the barrier films of the present invention satisfy the standard ISO2528.

By "PVA film", we mean a PVA layer of low thickness having a density of between 1000 and 1300 kg/m³. In this invention, the PVA films typically have a thickness greater than 0.05 µm. Typically, the thickness of the film is between 0.05-25 µm, 0.05-15 µm, and 0.05-10 µm, and preferably between 5-10 µm.

By "PVA", we mean polyvinyl alcohol. It is typically obtained by free radical polymerization of vinyl acetate in methanol, followed by alcoholysis. According to the degree of hydrolysis, a certain amount of acetate remains attached to the polymer chain. The PVA is therefore characterized by its molar mass and its degree of hydrolysis.

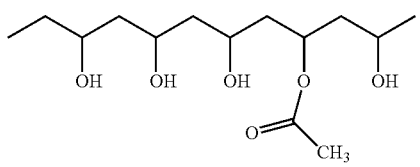

Simplified diagram of a PVA molecule

In the barrier films of this invention, the PVA preferably has a molecular weight of between 13,000 and 300,000, 30,000 and 300,000, 50,000 and 200,000, 75,000 and 200,000, 100,000 and 200,000. In a particularly advantageous embodiment, the PVA has a molecular weight of 145,000.

In the barrier films of this invention, the PVA preferably has a degree of hydrolysis greater 81%, 85%, 88%, 90%, 95%, 98% and more preferably greater than 99%.

The PVA film can also include fillers such as kaolin. These fillers preferably cause little to no modification of the barrier properties. Preferably, the PVA represents at least 50%, 60%, 70%, 80%, 90%, 95% of the PVA film. In a preferred embodiment of the invention, the PVA film consists of 100% PVA.

In the films with barrier properties of the present invention, the PVA films are surface-grafted with fatty acids. After surface-grafting of the fatty acid, the film with barrier properties preferably has a total thickness greater than 0.05 µm and preferably between 0.05 and 30 µm.

By "fatty acid", we mean an organic acid comprised of a linear hydrocarbon chain terminated at one of its ends by a carboxyl group and at the other end by a methyl group. The fatty acids used for grafting are fatty acids having an aliphatic chain including at least 12 carbon atoms. Preferably, the fatty acid is a fatty acid having an aliphatic chain including 12 to 30 carbon atoms. Preferably, the fatty acid is a fatty acid having an aliphatic chain including 16 to 22 carbon atoms. Preferably, the fatty acid is a saturated fatty acid. In a preferred embodiment of the invention, the fatty acid is chosen from stearic acid, palmitic acid and behenic acid. Preferably, the grafting is performed with stearic acid.

By "grafting", we mean the establishment of covalent bonds between the PVA and the fatty acids at the surface of the PVA film. The grafting is typically performed by esterification in the heterogeneous phase of the surface of the PVA film with the fatty acids. The surface-grafting of the PVA film involves, at the molecular level, sequential grafting of PVA molecules at the surface of the film.

By "sequential grafting", we mean grafting in which the PVA molecule consists of alternately grafted and non-grafted segments. The grafted segments form a continuous grafted PVA phase, which is directed toward the exterior of the material. The non-grafted segments also form a continuous phase, but directed toward the interior of the material.

The grafting of the fatty acid is performed at the surface and in a certain thickness of the film, but it does not take place in the entire thickness of the PVA film. A grafting front progresses from the exterior to the interior of the material. Before the grafting front, it is quantitative, and all of the hydroxyl groups of the PVA are grafted. Beyond the grafting front, the hydroxyl groups of the PVA are not grafted. Therefore, at the grafting front, there are PVA molecules with segments located before the front and which are entirely grafted, and segments that are beyond it and which are not grafted. The presence, in the same PVA molecule, of grafted and non-grafted segments completely modifies its rate of solubility because it is soluble neither in the usual PVA solvents (water) nor in the usual PVS solvents (chloroform).

If the reaction is allowed to continue beyond the necessary time, there is an excessive progression of the grafting front, which leads to the presence, at the surface, of PVA molecules that no longer have non-derivative segments and that then become soluble in the usual PVS solvents such as chloroform. IT is not usually necessary to eliminate the PVS possibly in excess, but a person skilled in the art will be capable, by adjusting the experimental conditions, of preventing it from forming.

Advantageously, a single face of the PVA film is surface-grafted with a fatty acid, and the other face is attached to a substrate.

This invention also relates to a substrate having a film with the barrier properties according to this invention. In a preferred embodiment, the substrate has said film with barrier properties on only one face. Alternatively, the substrate can have the barrier film an all faces.

By "substrate", we mean any material, substrate or object capable of being covered with a PVA film. Owing to its film-forming properties, PVA can be adsorbed on hydrophilic substrates as well as on hydrophobic substrate.

The substrate having a film with barrier properties therefore acquires water, grease, gas and water vapor barrier properties.

According to a preferred embodiment of the invention, the substrate is a paper and/or cardboard packaging substrate such as special industrial papers, printing and writing paper, newspaper, cardboard, flexible packaging papers or paper for corrugation. According to a particularly advantageous embodiment of the invention, the substrate is a cellulosic packaging material such as flexible packaging paper and flat cardboard.

Before the formation of the film with barrier properties on the substrate, it may be advantageous to apply a sub-layer of another material on the substrate. The application of a sub-layer makes it possible, for example, to fill or smooth irregularities of the substrate. The application of a sub-layer is of interest, for example, in the case of a porous substrate. Owing to the application of a sub-layer, it is then possible to form a film with barrier properties of very low thickness. The thickness of the PVA film can then be significantly reduced.

Advantageously, a starch sub-layer is applied before the film with barrier properties is formed when the substrate is a cellulosic-type material.

Among the materials capable of being used as sub-layers, the following will be cited in particular: starches, latex, proteins, cellulosic derivatives (carboxymethyl celluloses, for example) and all possible combinations of these products in a mixture with or without mineral fillers such as calcium carbonates, kaolins, talcs, and other pigments known to a person skilled in the art.

This invention also relates to a process for in situ formation of a film with barrier properties on the surface of a substrate.

Generally, the first step of the process consists of coating the surface of the substrate with PVA. The coating of the substrate with PVA is performed by means of known methods. Typically, the coating is performed with an aqueous PVA solution by applying techniques well known to a person skilled in the art. Size presses or metering size presses, blade coaters, rod coaters, air-blade coaters and curtain coaters are cited in particular. To obtain good barrier properties, it is preferable to apply a homogeneous PVA film.

Then, the PVA film is then dried. The drying can be performed, for example, alone or in combination with hot air ovens, infrared radiation ovens and drying cylinders.

The next step of fatty acid grafting is performed in situ on the substrate with the PVA film.

Typically, the grafting of the fatty acid on the PVA film is performed by esterification in the heterogeneous phase. Given that the grafting is performed in the heterogeneous phase, only the OH accessible at the surface of the PVA film are grafted with a fatty acid. The grafting is not performed in the entire thickness of the film. However, the progression of the grafting front enables the reagent to penetrate the thickness of the material because it is then solubilized in the superficial PVS phase created by the reaction of the acid chloride with the surface PVA.

Advantageously, the grafting is performed with an activated fatty acid so as to obtain satisfactory grafting on the hydroxyl groups of the PVA film within a relatively short grafting time. The activated fatty acid is, for example, a fatty acid chloride.

The grafting is performed according to techniques well known to a person skilled in the art, for example, in aprotic solvent conditions, such as toluene or petroleum ether in the presence of a reagent of the acid chloride type and a catalyst of the pyridine type. The grafting can also be performed by chromatogenic chemistry techniques (EP 1007202). This technique also uses reagents of the acid chloride type, but in the absence of a solvent and a catalyst during the grafting phase.

In the chromatogenic chemistry methods, the grafting is performed at a temperature above the melting temperature of the fatty acid and below the melting temperature of the PVA. Preferably, the grafting is performed at between 70° C. and 185° C. The grafting of the fatty acid chloride is preferably performed under nitrogen flushing with a slight vacuum (900 mbar) so as to remove the hydrochloric acid formed during the reaction.

A grafting time of 30 seconds enables a significant improvement in the barrier properties to be obtained. Preferably, the grafting time is less than 5 minutes, and preferably less than 2 minutes and more preferably less than 1 minute.

The grafting can therefore be performed according to different processes well known to a person skilled in the art. According to the grafting process chosen, a person skilled in the art will be able to determine the reaction conditions (amount of reagent, reaction time, temperature, and so on) so as to obtain a grafting enabling the formation of a layer of sequentially grafted PVA molecules that are non-extractible with an organic solvent.

In the case of "over-grafting", a layer of entirely grafted PVA molecules of which all of the OH groups are substituted will also be formed. This layer is extractible with an organic solvent. IT is not necessary for obtaining barrier properties. Its presence does not alter the barrier properties obtained owing to the underlying sub-layer that is non-extractible with an organic solvent.

For certain substrates, in particular when the substrate is a paper-type cellulosic substrate, the process of in situ formation of a film with barrier properties on the paper can include a calendaring step. By "calendaring", we mean an operation performed by means of a calendar on at least partially dried paper or cardboard and intended to improve the surface state. This operation also makes it possible, to some degree, to regularize the thickness of the material. In papermaking, the calendaring operation enables different surface states of the sheet of paper to be obtained, in particular for coated papers. Depending on whether the paper is more or less calendared (pressure, heating temperature), the paper is more or less smooth and glossy. The calendaring step is preferably performed after coating with PVA and drying.

The figures and examples below show the invention, with the understanding that the invention is not limited to the embodiments described.

FIGURES

FIG. 1: Diagram of PVA grafting.

Figure 2:
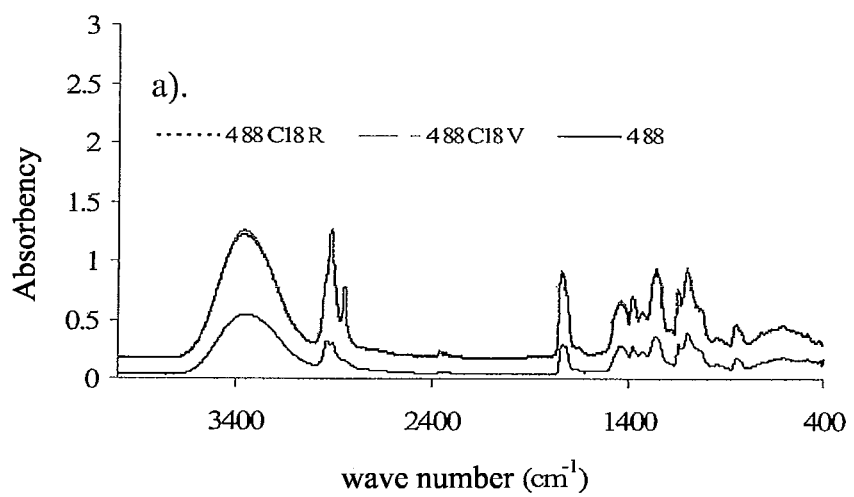
Figure 2:
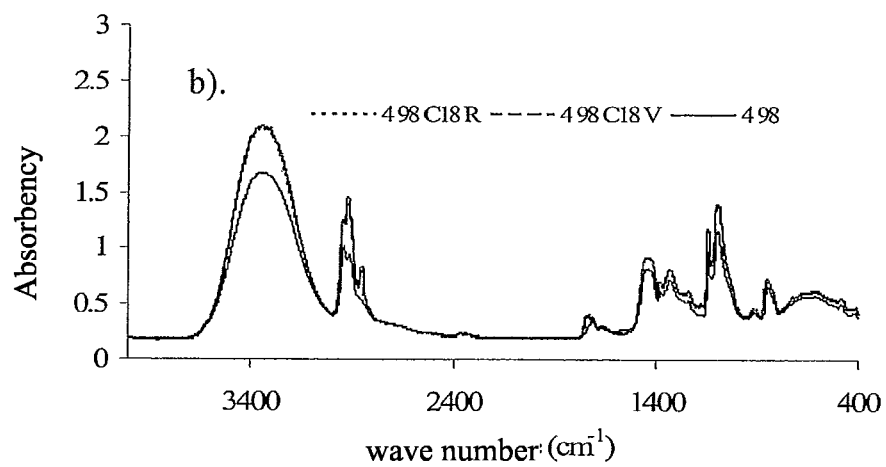
Figure 2:
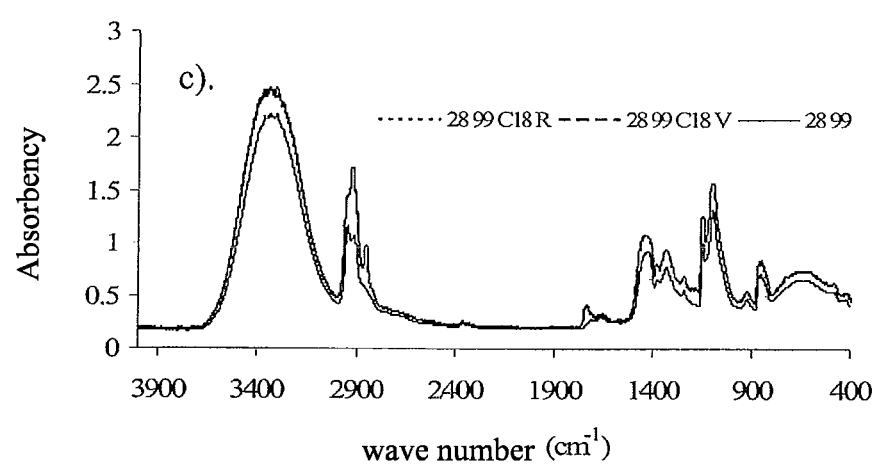

FIG. 2: Transmission IRTF spectra of polyvinyl alcohol films non-grafted and grafted with C18: a). Mowiol 4-88, b).

Mowiol 4-98, c). Mowiol 28-99: (_)—non-grafted film, ( . . . )—film grafted on front side, ( - - - )—film grafted on back side.

Figure 3:
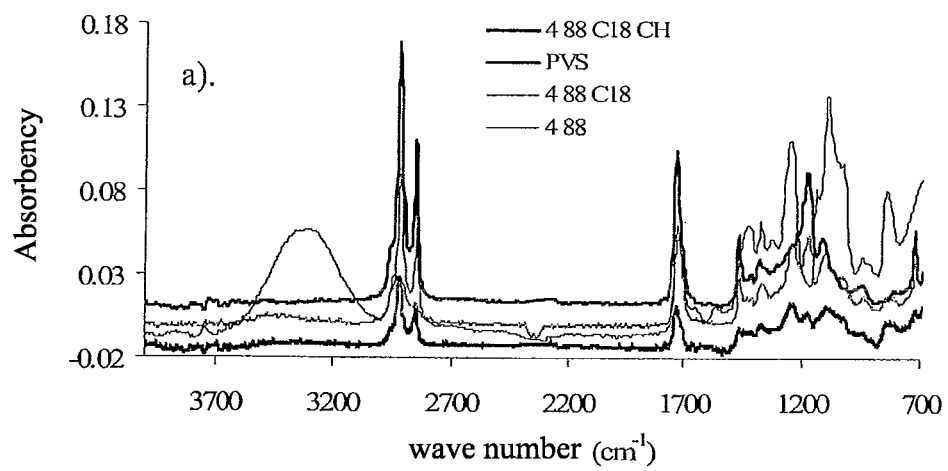
Figure 3:
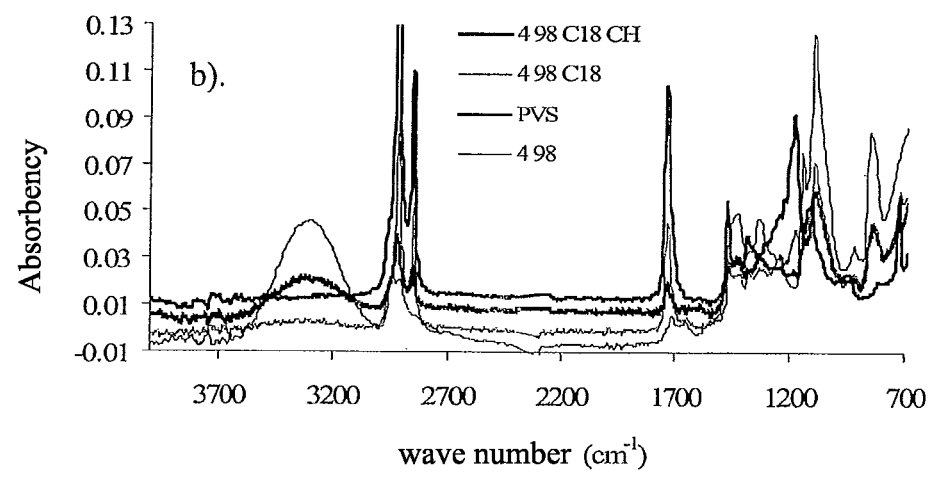
Figure 3:
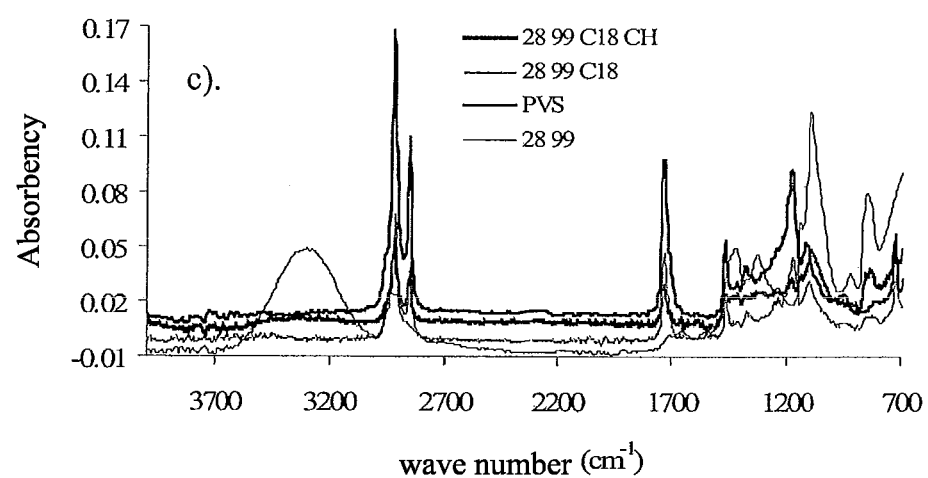

FIG. 3: IRTF-ATR spectra of polyvinyl stearate and polyvinyl alcohol films: a) Mowiol 4-88, b) Mowiol 4-98, c) Mowiol 28-99, before and after grafting with C18 as well as after washing of the grafted films with chloroform.

Figure 4:
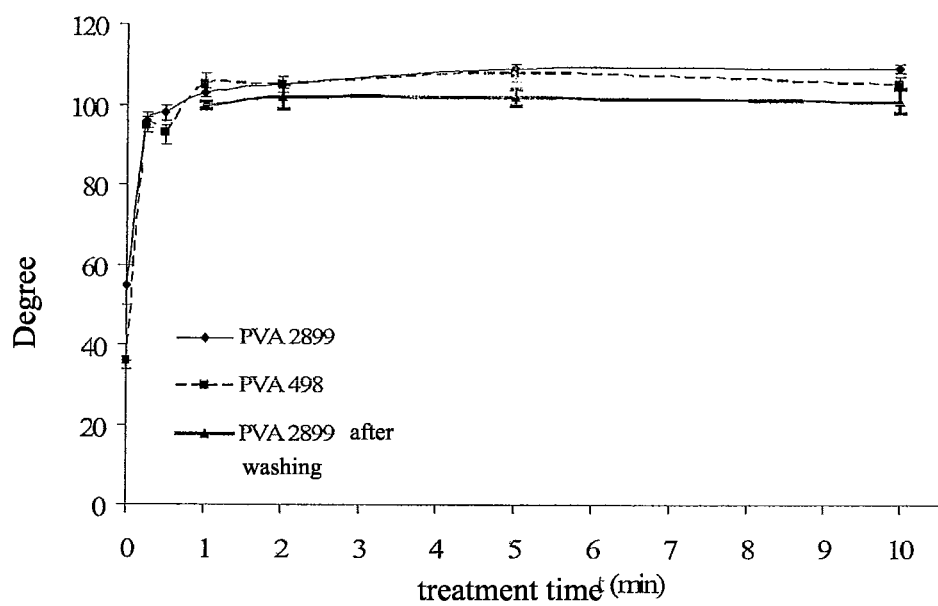

FIG. 4: Variation of the contact angle as a function of the grafting time.

EXAMPLES

1. Material Used 1.1. Type of Polymer

Polyvinyl alcohol provided by Kuraray Specialités Europe® under the trade name Mowiol™. We used three types of Mowiol™ with different degrees of hydrolysis. The properties of these polyvinyl alcohols are presented in Table 1:

TABLE 1

Properties of polyvinyl alcohols.

| PVA type | Viscosity [1] DIN 53015 (mPa · s) | Degree of hydrolysis (saponification) (mol.-%) | Molecular weight (g) | Residual acetyl content (w/w-%) | Max ash content [2] (%) |
|---|---|---|---|---|---|
| Mowiol ™ 4-88 (partially hydrolyzed PVA) | 4 ± 0.5 | 87.7 ± 1.0 | ~31,000 | 10.8 ± 0.8 | 0.5 |
| Mowiol ™ 4-98 (entirely hydrolyzed PVA) | 4.5 ± 0.5 | 98.4 ± 0.4 | ~27,000 | 1.5 ± 0.4 | 0.5 |
| Mowiol ™ 28-99 (entirely hydrolyzed PVA) | 28 ± 2.0 | 99.4 ± 0.4 | ~145,000 | 0.6 ± 0.4 | 0.5 |

Remark:
[1] measured for a 4% aqueous solution at 20° C.
[2] calculated as $Na_2O$ 1.2. Grafting Agent Stearic acid chloride provided by the Aldrich Chemical Company®.

1.3. Type of Cellulosic Substrate 1.3.1. Cardboard

Performa Natura® cardboard was provided by Smurfit Kappa and consists of layers, a double coating on the face to be printed, then there is a layer of bleached sulphate pulp, followed by a layer f a mixture of bleached sulphate pulp and bleached CMT pulp, and a back layer of bleached sulphate pulp.

Table 2 shows the properties of the cardboard provided by the supplier.

TABLE 2

Cardboard properties.

| Basic weight (g/m²) | Thickness (µm) | Moisture content (%) | Brightness C/2° (%) | Roughness (ml/mn) | Gloss (%) |
|---|---|---|---|---|---|
| ISO 536 | ISO 534 | ISO 287 | ISO 2470 | ISO 8791-2 | ISO 8791-4 |
| 255 | 350 | 7 | 85 | 60 | 45 |

1.3.2. Paper

This is a paper generally used for flexible packagings, treated with binding agents to improve its water resistance.

The properties of the paper are presented in Table 3:

TABLE 3

Paper properties.

| Basic weight (g/m²) | Thickness (µm) ISO 534 | Moisture content (%) ISO 287 |
|---|---|---|
| 41 | 54 | 6 |

2. Treatment Methods

Grafting by Chromatogenic Chemistry

This grafting can be implemented in two ways, either by depositing the reagent uniformly on the surface of the material with processes derived from those used in printing (flexography or heliography) or by immersing the sample to be treated in an acid chloride solution dissolved in an aprotic, anhydrous, apolar and volatile solvent of the petroleum ether or halogenated solvent type. In the first case, the sample is placed directly in a chamber under slight vacuum pressure, ventilated with a slight nitrogen current and at a temperature ranging from 70 to 185° C. In the second case, the volatile solvent is first allowed to evaporate before the sample is placed in the ventilated chamber. The second method is easier to perform in the laboratory, but it has the disadvantage of treating both faces of the material and exposing it to an organic solvent.

As it is not always possible to know exactly what amount of reagent will be consumed by the reaction, an excess of reagent is deliberately deposited at the surface of the material to be treated, then, after a certain time, the excess or degraded reagent is removed with ethanol, which is a non-solvent of PVA and grafted PVA.

Example of Deposition of Reagents by Heliographic Process

We used a laboratory prototype having a heliographic coating head with a chambered doctor blade manufactured by the APM (Atelier de Précision Mécanique) Company, 4, rue des Orfevres, 31700, Cornebarrieu and ceramic anilox rolls manufactured by the Cylindres Company: BAT Graphics (M. Bachkine), 8 Allée Skylab, 87068 Limoges, enabling reagent volumes of between 50 µL and 2 mL/m2 to be deposited. The apparatus, which was developed for the European Phycello program in which CERMAV participated, is housed at the Toulouse Chemical Engineering Laboratory, with which we regularly collaborate. The prototype is an unwinder/winder system that has a width of 20 cm and that rotates at a speed of 20 meters/minute.

The deposition of stearic acid chloride is performed at 25° C. on the PVA-coated surface, the samples are then immediately placed in an oven at 150° C. under slight vacuum pressure (900 mbar) and with a slight nitrogen flushing in order to promote the removal of hydrochloric acid, which forms during the reaction. The baking time varies between 30 seconds and 10 minutes.

Example of Deposition of Reagents by Immersion.

A solution of stearic acid chloride in anhydrous petroleum ether, 100/140, is prepared. The concentration of reagent is between 0.1 and 1% w/w. The sample to be treated is briefly immersed in the solution, then removed, the petroleum ether is evaporated and the sample is placed as above, in a ventilated oven.

3. Apparatus for Deposition of the Polymer Layer

The deposition of the polymer layer was performed by means of the "EnduPap" laboratory coating bench developed at the CTP (Centre Technique du Papier—P. Vallette et G. Gervason, 1976), which enables both the deposition of the polymer layer having different layer weights but also the infrared drying of the paper.

4. Measurements Performed 4.2. Permeability in Water

In papermaking, in order for a material to be considered to be a water barrier, the values obtained for the $Cobb_{60}$ measurement must be below 10. A value close to zero indicates that the material has exceptional barrier properties.

4.2.1. Cobb—60 Second

The Cobb test, French standard NF Q 03-018, was used to determine the amount of water absorbed by the coated or uncoated and grafted or non-grafted paper or cardboard.

The three types of PVA were used for coating cellulosic substrates.

A time of 60 seconds was chosen to measure the amount of water absorbed per square meter.

The water permeability was measured on the paper and cardboard coated with layers of different weights. Thus, the paper was coated with layers having weights of 3, 6 and 9 g/m² while the cardboard was coated with layers having weights of 3, 6, 9 and 15 g/m².

These materials were then grafted with stearic acid chloride ($C_{17}$.COCl).

4.2.1.1. Cardboard

The results obtained for cardboard are presented in Table 5:

TABLE 5

Amount of water absorbed (g/m²) over a time of 60 seconds by the cardboard coated with PVA and grafted with stearic acid or not.

| Type of polyvinyl alcohol | $Cobb_{60}$ (g/m²) Layer weight (g/m²) | | | | | Standard deviation (g/m²) | | | | |
|---|---|---|---|---|---|---|---|---|---|---|
| | 0 | 3 | 6 | 9 | 15 | 0 | 3 | 6 | 9 | 15 |
| Mowiol ™ 4-88 | 24 | 29 | 27 | 23 | 20 | 0.7 | 0.9 | 2.1 | 2.1 | 5.8 |
| Mowiol ™ 4-88 C18 | 14 | 14 | 13 | 4 | 0 | 1.5 | 2.8 | 1.8 | 0.9 | 0.1 |
| Mowiol ™ 4-98 | 24 | 26 | 26 | 23 | 9 | 0.7 | 0.9 | 0.9 | 0.8 | 2.3 |
| Mowiol ™ 4-98 C18 | 14 | 16 | 11 | 3 | 0 | 1.5 | 3.7 | 1.0 | 1.1 | 0.2 |
| Mowiol ™ 28-99 | 24 | 24 | 18 | 18 | 14 | 0.7 | 1.4 | 3.0 | 4.4 | 5.3 |
| Mowiol ™ 28-99 C18 | 14 | 3 | 0 | 0 | 0 | 1.5 | 2.1 | 0.5 | 0.2 | 1.0 |

4.2.1.2. Paper

The results of the Cobb measurements performed on the paper coated with the three types of PVA which were then subjected to grafting or not are presented in Table 6:

TABLE 6

Amount of water absorbed (g/m²) over a time of 60 seconds by the paper coated with PVA and grafted with stearic acid or not.

| Type of polyvinyl alcohol | $Cobb_{60}$ (g/m²) Layer weight (g/m²) | | | | Standard deviation (g/m²) | | | |
|---|---|---|---|---|---|---|---|---|
| | 0 | 3 | 6 | 9 | 0 | 3 | 6 | 9 |
| Mowiol ™ 4-88 | 18 | 18 | 16 | 10 | 0.4 | 2.2 | 1.8 | 1.5 |
| Mowiol ™ 4-88 C18 | 10 | 4 | 1 | 0 | 1.1 | 0.4 | 0.2 | 0.3 |
| Mowiol ™ 4-98 | 18 | 25 | 25 | 19 | 0.4 | 1.7 | 0.6 | 1.2 |
| Mowiol ™ 4-98 C18 | 10 | 2 | 2 | 1 | 1.1 | 0.5 | 0.8 | 0.1 |
| Mowiol ™ 28-99 | 18 | 21 | 20 | 13 | 0.4 | 0.7 | 0.8 | 3.1 |
| Mowiol ™ 28-99 C18 | 10 | 1 | 0 | 0 | 1.1 | 0.3 | 0.2 | 0.2 |

We observe that the cardboard as well as the paper, coated with PVA and then grafted with stearic acid chloride, are good water barriers, with a Cobb index of 0 being obtained for the highest layer weights.

4.2.2. Cobb 5 and 30 Minutes.

To determine the resistance of these materials to prolonged exposure to water, 5- and 30-minute Cobb measurements were performed.

4.2.2.1. Cardboard

The results obtained for cardboard coated with 15 g/m² of PVA are presented in Table 7.

TABLE 7

Amount of water absorbed (g/m²) by the cardboard coated with PVA and grafted with stearic acid after exposure to water for 5 and 30 minutes.

| Type of layer | Time (dry) | Cobb (g/m²) | Standard deviation (g/m²) |
|---|---|---|---|
| Mowiol ™ 4-88 C18 | 60 | 0 | 0.1 |
| | 300 | 2 | 0.9 |
| | 1800 | 13 | 2.2 |
| Mowiol ™ 28-99 C18 | 60 | 0 | 1.0 |
| | 300 | 1 | 0.6 |
| | 1800 | 8 | 2.0 |

4.2.2.2. Paper

The same measurements as for the cardboard were performed for the paper.

The results obtained are presented in Table 8:

TABLE 8

Amount of water absorbed (g/m²) by the paper coated with PVA and grafted with stearic acid after exposure to water for 5 and 30 minutes.

| Type of layer | Time (sec) | Cobb (g/m²) | Standard deviation (g/m²) |
|---|---|---|---|
| Mowiol ™ 4-88 C18 | 60 | 0 | 0.2 |
| | 300 | 3 | 0.9 |
| | 1800 | 25 | 1.4 |
| Mowiol ™ 4-98 C18 | 60 | 1 | 0.1 |
| | 300 | 9 | 4.6 |
| | 1800 | 19 | 2.0 |
| Mowiol ™ 28-99 C18 | 60 | 0 | 0.2 |
| | 300 | 2 | 1.0 |
| | 1800 | 8 | 0.5 |

It is noted that, for the most highly hydrolyzed PVA with the highest molecular weight, the Cobb value remained below 10 g/m², for both the cardboard and the paper, even after exposure to water for 30 minutes. This means that the more the PVA is hydrolyzed, the better the effectiveness of the grafting is and therefore the better the water barrier is. Conversely, less hydrolyzed PVAs with a lower molecular weight have Cobb values that increase significantly with time.

4.3. Permeability to Water Vapor—ISO Standard 2528

4.3.1. Permeability to Water Vapor Measured at 23° C. and 50% RH

TABLE 9

Permeability to water vapor of papers coated with 9 g/m² of different types of polyvinyl alcohol measured before and after the grafting with stearic acid chloride.

| Type of layer | Transmission coefficient (g/m²/day) | Standard deviation (g/m²/day) |
|---|---|---|
| Mowiol 4-88 | 16.00 | 2.00 |
| Mowiol 4-88 $C_{18}$ | 16.43 | 1.51 |
| Mowiol 4-98 | 7.77 | 3.39 |
| Mowiol 4-98 $C_{18}$ | 9.10 | 3.51 |
| Mowiol 28-99 | 4.08 | 2.95 |
| Mowiol 28-99 $C_{18}$ | 4.08 | 1.94 |

TABLE 10

Permeability to water vapor of cardboards coated with 9 g/m² of different types of polyvinyl alcohol measured before and after the grafting with stearic acid chloride.

| | Transmission coefficient (g/m²/day) | | Standard deviation (g/m²/day) | |
|---|---|---|---|---|
| | Layer weight (g/m²) | | | |
| Type of polyvinyl | 9 | 15 | 9 | 15 |
| Mowiol 4-88 | 43.36 | 6.88 | 3.76 | 2.42 |
| Mowiol 4-88 $C_{18}$ | 43.69 | 6.81 | 4.45 | 1.67 |
| Mowiol 4-98 | 15.67 | 1.29 | 1.00 | 0.70 |
| Mowiol 4-98 $C_{18}$ | 34.28 | 1.96 | 4.69 | 1.43 |
| Mowiol 28-99 | 10.56 | 5.92 | 7.47 | 3.88 |
| Mowiol 28-99 $C_{18}$ | 7.68 | 1.28 | 3.62 | 0.55 |

Values below 10 g/m²/day were obtained for a layer of 15 g/m² for cardboard and for a layer of 9 g/m² for paper. In addition, as for the water barrier, the more the PVA is hydrolyzed and has a high molecular weight, the better the water vapor barrier properties are.

4.3.2. Permeability to Water Vapor Measured at 38° C. and 90% RH

TABLE 11

Permeability to water vapor of papers and cardboards coated with Mowiol 28-99, measured before and after grafting with stearic acid chloride.

| | Paper | | | | Cardboard | | | |
|---|---|---|---|---|---|---|---|---|
| | NG | | G | | NG | | G | |
| Layer weight (g/m²) | WVP (g/m²/day) | Standard deviation | WVP (g/m²/day) | Standard deviation | WVP (g/m²/day) | Standard deviation | WVP (g/m²/day) | Standard deviation |
| 0 | 1139.20 | 108.65 | 1082.72 | 82.95 | 2092.48 | 280.63 | 2113.12 | 150.55 |
| 3 | 1216.13 | 137.34 | 728.08 | 77.04 | 1940.73 | 74.26 | 795.61 | 204.78 |
| 6 | 986.08 | 61.57 | 614.56 | 89.53 | 1947.68 | 87.22 | 568.80 | 9.99 |
| 9 | 890.56 | 59.11 | 467.52 | 130.95 | 1994.56 | 42.47 | 630.72 | 127.03 |
| 15 | — | — | — | — | 1826.40 | 66.53 | 307.04 | 45.97 |

* NG = non-grafted; G = grafted

Neither the paper nor the cardboard coated with PVA provide a water vapor barrier, even if the weight of the PVA layer increases. However, once it is grafted, a significant decrease in the permeability to water vapor may be observed, as can be seen in Table 11.

4.4. Permeability to Air—Mariotte's Bottle—French Standard NF Q 03-075

The range of permeability covered by the present standard is: $10^{-2}$ to $10^2$ cm3/m²·Pa·s.

Our results, with the exception of the permeability for non-coated paper, are within the range covered by this standard.

4.4.1 Paper

TABLE 12

Permeability to air of paper as a function of the layer weight and the type of PVA

| | Mowiol 4-88 | | | | Mowiol 28-99 | | | |
| | NG | | G | | NG | | G | |
| Layer weight ($g/m^2$) | Permeability to air ($cm^3/m^2Pas$) | Standard deviation ($cm^3/m^2Pas$) | Permeability to air ($cm^3/m^2Pas$) | Standard deviation ($cm^3/m^2Pas$) | Permeability to air ($cm^3/m^2Pas$) | Standard deviation ($cm^3/m^2Pas$) | Permeability to air ($cm^3/m^2Pas$) | Standard deviation ($cm^3/m^2Pas$) |
|---|---|---|---|---|---|---|---|---|
| 0 | 0.174 | 0.0022 | 0.160 | 0.0032 | 0.174 | 0.0022 | 0.160 | 0.0032 |
| 3 | 0.003 | 0.0003 | 0.004 | 0.0011 | 0.002 | 0.0014 | 0.006 | 0.0030 |
| 6 | 0.002 | 0.0002 | 0.002 | 0.0005 | 0.003 | 0.0015 | 0.004 | 0.0003 |
| 9 | 0.002 | 0.0004 | 0.002 | 0.0003 | 0.003 | 0.0012 | 0.004 | 0.0020 |

According to these results, the material is highly permeable to air, and this is not dependent on the layer weight, the type of PVA or grafting. This property is induced by the PVA layer.

Moreover, the grafting does not influence the permeability to air of the uncoated paper, whereas, on the coated paper, an increase in permeability to air is observed.

4.4.2. Cardboard

TABLE 13

Permeability to air of cardboard as a function of the layer weight and the type of PVA

| | Mowiol 4-88 | | | | Mowiol 28-99 | | | |
| | NG | | G | | NG | | G | |
| Layer weight ($g/m^2$) | Permeability to air ($cm^3/m^2Pas$) | Standard deviation ($cm^3/m^2Pas$) | Permeability to air ($cm^3/m^2Pas$) | Standard deviation ($cm^3/m^2Pas$) | Permeability to air ($cm^3/m^2Pas$) | Standard deviation ($cm^3/m^2Pas$) | Permeability to air ($cm^3/m^2Pas$) | Standard deviation ($cm^3/m^2Pas$) |
|---|---|---|---|---|---|---|---|---|
| 0 | 0.031 | 0.0024 | | | 0.031 | 0.0024 | | |
| 3 | 0.030 | 0.0013 | 0.039 | 0.0007 | 0.024 | 0.0030 | 0.032 | 0.0032 |
| 6 | 0.022 | 0.0023 | 0.037 | 0.0028 | 0.020 | 0.0014 | 0.025 | 0.0012 |
| 9 | 0.015 | 0.0020 | 0.024 | 0.0015 | 0.019 | 0.0007 | 0.026 | 0.0033 |
| 15 | 0.020 | 0.0016 | 0.022 | 0.0013 | 0.020 | 0.0011 | 0.022 | 0.0020 |

The same remarks can be made for cardboard as for paper, except that the permeability to air of uncoated cardboard is lower than that of paper, due to its composition.

The coating with PVA does not significantly decrease the permeability to air even if the layer weights are greater, whereas, for paper, a significant decrease in permeability to air was obtained even for low layer weights.

This difference is due to the spreading of the PVA on the two substrates, as the spreading is better on paper, which is more regular than cardboard. Moreover, a simple defect in the layer could result in a significant decrease in air barrier properties.

4.5. Resistance to Grease—Kit Test—Tappi Method—T559 pm-96

The intensity of the grease resistance increases with the value given by the Kit Test. A value above 10 is necessary for a material to be considered to be a grease barrier.

The results obtained are presented in the table below.

TABLE 14

Grease resistance of papers coated with polyvinyl alcohol, as a function of the layer weight and the type of polyvinyl alcohol.

| | Kit Test (number) | | | |
| | Layer weight ($g/m^2$) | | | |
| Type of layer | 0 | 3 | 6 | 9 |
|---|---|---|---|---|
| Mowiol 4-88 | 1 | 3 | 8.8 | 12 |
| Mowiol 4-88 $C_{18}$ | 2 | 3 | 6.2 | 9 |
| Mowiol 4-98 | 1 | 5.8 | 2 | 7.6 |
| Mowiol 4-98 $C_{18}$ | 2 | 4.8 | 4.6 | 6.6 |
| Mowiol 28-99 | 1 | 4.4 | 4 | 12 |
| Mowiol 28-99 $C_{18}$ | 2 | 4.8 | 5.6 | 12 |

TABLE 15

Grease resistance of cardboards coated with polyvinyl alcohol, as a function of the layer weight, the type of polyvinyl alcohol and the grafting.

| | Kit Test (number) Layer weight (g/m²) | | | | |
|---|---|---|---|---|---|
| Type of layer | 0 | 3 | 6 | 9 | 15 |
| Mowiol 4-88 | 1 | 1.4 | 3.4 | 11 | 12 |
| Mowiol 4-88 $C_{18}$ | 1 | 1 | 1 | 5 | 12 |
| Mowiol 4-98 | 1 | 1 | 2 | 9.6 | 12 |
| Mowiol 4-98 $C_{18}$ | 1 | 1 | 1.2 | 6 | 12 |
| Mowiol 28-99 | 1 | 2.2 | 7.6 | 11.6 | 12 |
| Mowiol 28-99 $C_{18}$ | 1 | 7.4 | 6.2 | 11.6 | 12 |

The grease resistance does not appear to increase with the degree of hydrolysis or with grafting for PVAs having low molecular weights, but, by contrast, it clearly increases with the layer weight and with high PVA molecular weight values. Contrary to what is observed with low molecular weights, grafting increases grease resistance for high molecular weights.

5. Influence of the Molecular Weight and the Degree of Hydrolysis of the PVA on the Barrier Properties of the Grafted Films To validate the explanation according to which the barrier properties are due to the development of a complex material including PVA macromolecules sequentially derived by means of fatty acids (FIG. 1), the polyvinyl alcohol films were washed by soaking in chloroform for 24 hours in order to remove the excess polyvinyl stearate formed during the grafting reaction.

5.1. Influence of the Degree of Hydrolysis of the Polyvinyl Alcohol

As chloroform is a good solvent for polyvinyl stearate, it dissolves fully grafted polyvinyl alcohol macromolecules so that, after washing, only sequentially grafted PVA molecules remain on the film. The thickness of grafted and dissolved films was determined by converting the amount dissolved into thickness, as follows:

$$\text{thickness} = \frac{m_1 - m_2}{S * d}$$

1)
in which: $m_1$=the mass of the film before washing (g)
$m_2$=the mass of the film after washing (g)
S=the surface of the film analyzed (cm²)
d=the density of the film (g/cm³)
The results obtained are presented in Table 14.

TABLE 14

Thickness of fully grafted films as a function of the type of PVA.

| Type of polyvinyl alcohol | Thickness of the grafted film (μm) |
|---|---|
| Mowiol 4-88 $C_{18}$ | 9.7 |
| Mowiol 4-98 $C_{18}$ | 1.8 |
| Mowiol 28-99 $C_{18}$ | 1 |

The thickness of fully grafted films is dependent on the degree of hydrolysis. A high acetate content promotes the diffusion of reagent by introducing defects in the grafted polymer. It can be concluded that the fewer defects there are in the grafted film, the less diffusion there will be, and, therefore, the lower the amount of grafted PVA will be.

5.2. Influence of the Molecular Weight of the Polyvinyl Alcohol

The IRTF-ATR spectra, (FIG. 2), of the polyvinyl alcohol films grafted before and after washing with chloroform show the appearance at 3300-3400 cm$^{-1}$ of the absorption band characteristic of hydroxyl groups. This is more evident for Mowiol 4-98. In fact, in the case of Mowiol 4-88, which has a molecular weight close to that of Mowiol 4-98, the effect of washing is less visible due to the presence of acetate groups in the structure of the PVA. By contrast, Mowiol 28-99 has fewer hydroxyl groups even after washing, which demonstrates, with respect to Mowiol 4-98, which has a degree of hydrolysis very similar to it but a much lower molecular weight, that the decisive factor in the final properties of the grafted films, aside from the degree of hydrolysis, is the molecular weight. A high molecular weight, associated with a high degree of hydrolysis, will result in a film that, after grafting, has the best barrier properties.

6. Influence of the Grafting Time on the Barrier Properties of Papers Coated with PVA 6.1. Water Absorption—$Cobb_{60}$ Method The influence of the grafting time on the water resistance of the paper coated with PVA and grafted with C18 was analyzed by means of the $Cobb_{60}$ test.

Papers coated with 10 g/m² of polyvinyl alcohol, Mowiol 4-98 and Mowiol 28-99 were treated at 105° C. for 24 hours and then grafted with stearic acid chloride. The grafting took place at a temperature of 150° C. under a pressure of 900 mbar and nitrogen flushing.

TABLE 17

Amount of water absorbed (g/m2) as a function of the grafting time and the type of polyvinyl alcohol.

| | Type of polyvinyl alcohol | | | |
|---|---|---|---|---|
| | Mowiol 4-98 $C_{18}$ | | Mowiol 28-99 $C_{18}$ | |
| Duration of treatment (min) | Cobb (g/m²) | Standard deviation (g/m²) | Cobb (g/m²) | Standard deviation (g/m²) |
| 0 | 23 | 0.6 | 25 | 2.1 |
| 0.25 | 21 | 1.8 | 18 | 0.9 |
| 0.5 | 14 | 1 | 8 | 2.6 |
| 1 | 11 | 2.1 | 5 | 1.7 |
| 2 | 10 | 2.3 | 1 | 0.7 |
| 5 | 1 | 0.8 | 1 | 0.4 |
| 10 | 3 | 0.5 | 2 | 0.6 |

After a grafting time of 30 seconds, a significant improvement in the water resistance of papers coated with PVA is observed.

Mowiol 4-98 requires a longer time than Mowiol 28-99 to provide good water barriers, with a time greater than 5 minutes being required to obtain a Cobb index below 10 g/m², whereas a time of 2 minutes is sufficient for proper grafting of Mowiol 28-99.

6.2. Contact Angle

Polyvinyl alcohol, according to the type, was deposited on Mylar and then grafted with stearic acid chloride, under the same conditions as the papers, so that the wettability property could be measured as a function of the grafting time.

TABLE 18

Contact angle (°) as a function of the grafting time and the type of polyvinyl alcohol.

| | Type of polyvinyl alcohol | | | |
|---|---|---|---|---|
| | Mowiol 4-98 $C_{18}$ | | Mowiol 28-99 $C_{18}$ | |
| Duration of the grafting treatment (min) | Contact angle (°) | Standard deviation (°) | Contact angle (°) | Standard deviation (°) |
| 0 | 36 | 2 | 55 | 5 |
| 0.25 | 95 | 2 | 96 | 2 |
| 0.5 | 93 | 3 | 98 | 2 |
| 1 | 105 | 2 | 103 | 1 |
| 2 | 105 | 1 | 105 | 2 |
| 5 | 108 | 2 | 109 | 1 |
| 10 | 103 | 1 | 109 | 1 |

No differences were observed between the two types of polyvinyl alcohol with regard to wettability. Moreover, for Mowiol 4-98, as well as for Mowiol 28-99, a grafting time of one minute is sufficient to obtain contact angles greater than 100°.

7. Barrier Properties of Papers Coated with the PVA-Starch Mixture

Mixtures of polyvinyl alcohol (Mowiol 28-99) and modified corn starch (C*Film TCF 07311—provided by Cerestar—Cargill group) in different proportions (Table 19) were prepared and used to coat papers of 40 g/m².

TABLE 19

Polyvinyl alcohol - starch mixtures.

| Sample | Amount of Mowiol 28-99 (%) | Amount of starch C 03711 (%) |
|---|---|---|
| 1 | 100 | — |
| 2 | — | 100 |
| 3 | 25 | 75 |
| 4 | 50 | 50 |
| 5 | 75 | 25 |

10 g/m² of each mixture were deposited and, after drying at 105° C. for 24 h, the coated papers were grafted with stearic acid chloride. The grafting conditions were: 10 minutes at 150° C. under a pressure of 900 mbar and nitrogen flushing.

7.1. Water Barrier—Cobb Method

The amount of water absorbed was determined by the Cobb method for a time of 30, 60, 300 and 1800 seconds and a surface of 10.17 cm². The average of 3 to 5 measurements was used.

TABLE 20

Amount of water absorbed (g/m²) by the paper coated with different polyvinyl alcohol - starch mixtures, before and after grafting, with development times of:
a) 30 s, b) 60 s, c) 300 s, d) 1800 s.

| | Sample | $Cobb_{30}$ (g/m²) NG | G | Standard deviation (g/m²) NG | G |
|---|---|---|---|---|---|
| a) | 1 | 20 | 0 | 8.9 | 0.1 |
| | 2 | 12 | 9 | 2.9 | 1.5 |
| | 3 | 22 | 3 | 1.7 | 0.7 |
| | 4 | 33 | 3 | 4.0 | 1.8 |
| | 5 | 26 | 0 | 4.6 | 0.1 |

TABLE 20-continued

Amount of water absorbed (g/m²) by the paper coated with different polyvinyl alcohol - starch mixtures, before and after grafting, with development times of:
a) 30 s, b) 60 s, c) 300 s, d) 1800 s.

| | Sample | NG | G | G - washed with chloroform | NG | G | G - washed with chloroform |
|---|---|---|---|---|---|---|---|
| | | | $Cobb_{60}$ (g/m²) | | | Standard deviation (g/m²) | |
| b) | 1 | 27 | 0 | 1 | 1.5 | 0.0 | 0.4 |
| | 2 | 13 | 8 | 11 | 2.3 | 1.3 | 1.6 |
| | 3 | 27 | 5 | 20 | 1.1 | 0.6 | 1.9 |
| | 4 | 44 | 4 | 18 | 5.6 | 1.3 | 0.8 |
| | 5 | 41 | 2 | 15 | 3.9 | 0.1 | 0.3 |
| | | | $Cobb_{300}$ (g/m²) | | | | |
| c) | 1 | 45 | 2 | 4 | 2.8 | 0.1 | 1.1 |
| | 2 | 18 | 12 | 11 | 0.2 | 2.5 | 2.1 |
| | 3 | 31 | 15 | 24 | 2.2 | 1.1 | 1.6 |
| | 4 | 41 | 16 | 28 | 1.9 | 1.3 | 3.7 |
| | 5 | 38 | 16 | 23 | 2.5 | 3.1 | 0.8 |
| | | | $Cobb_{1800}$ (g/m²) | | | | |
| d) | 1 | 43 | 15 | 9 | 1.3 | 0.8 | 0.6 |
| | 2 | 20 | 12 | 15 | 1.4 | 2.9 | 2.6 |
| | 3 | 33 | 21 | 28 | 1.9 | 0.8 | 3.8 |
| | 4 | 40 | 28 | 36 | 2.9 | 4.7 | 4.1 |
| | 5 | 61 | 31 | 29 | 2.8 | 7.1 | 2.2 |

We observe that adding starch to the coating slip decreases the water resistance of the materials. This lower water resistance is even more clearly evident when coated papers are washed with chloroform.

The papers coated with pure polyvinyl alcohol 28-99 preserve their hydrophobic properties even after washing. Cobb values below 10 g/m² are obtained, even after exposure to water for 30 minutes.

In the case of papers coated with starch, after they are washed with chloroform, the Cobb index always remains above 10 g/m², regardless of the time of exposure to the grafting reagent.

7.2. Grease Barrier—Kit Test

The anti-grease properties of the papers coated with different polyvinyl alcohol-starch mixtures, before and after grafting with stearic acid chloride, were measured with the Kit Test (Table 21).

TABLE 21

Grease resistance of papers coated with different starch - polyvinyl alcohol mixtures, before and after grafting, with stearic acid chloride.

| | Kit Test (number) | | |
|---|---|---|---|
| Sample | NG | G | G - washed with chloroform |
| 1 | >12 | >12 | >12 |
| 2 | 3 | 6 | 3 |
| 3 | 5 | 9 | 6 |
| 4 | >12 | >12 | 10 |
| 5 | >12 | >12 | >12 |

The polyvinyl alcohol used to coat the paper confers a good grease barrier thereon, whereas the starch layer does not form a barrier at all. An addition of 25% polyvinyl alcohol in the starch slip does not improve the barrier, and a larger amount, 50%, is required to begin to create grease barriers.

The grafting of papers coated with PVA does not decrease their grease resistance. Papers coated with starch or a polyvinyl alcohol-starch mixture, for polyvinyl alcohol amounts below 50%, do not have grease barriers after grafting. Therefore, to create an effective grease barrier, it is necessary for the amount of polyvinyl alcohol in the mixture to be greater than 50%. The same conclusion can be reached when the coated and grafted papers are washed with chloroform.

7.3. Permeability to Water Vapor (23° C. and 50% RH)

TABLE 22

Permeability to water vapor of paper coated with PVA, non-grafted or grafted with C18.

| Sample | Transmission coefficient (g/m²/day) | | Standard deviation (g/m²/day) | |
|---|---|---|---|---|
| | NG | G | NG | G |
| 1 | 3.53 | 3.53 | 2.97 | 3.37 |
| 2 | 256.76 | 260.57 | 11.81 | 19.93 |
| 3 | 98.28 | 62.81 | 5.80 | 1.80 |
| 4 | 20.33 | 21.74 | 5.68 | 5.85 |
| 5 | 10.29 | 7.66 | 5.87 | 2.40 |

The starch film does not form a water vapor barrier before or after grafting.

The water vapor barrier of papers coated with polyvinyl alcohol is created by the polyvinyl alcohol itself and not by the grafting thereof. Indeed, there are no differences between the grafted and the non-grafted polyvinyl alcohol layer (a transmission coefficient of 3.53 g/m²/day was obtained in both cases).

A decrease by a factor of 100 in the transmission coefficient of papers coated with starch with respect to papers coated with polyvinyl alcohol is observed. An increase in the amount of polyvinyl alcohol in the coating slip results in a decrease in the transmission coefficient of the water vapor.

8. Assay by Pyrolysis of Fatty Acid Grafted on the Polyvinyl Alcohol Films

The grafting density was determined by pyrolysis of the samples washed with chloroform and by gas chromatography coupled with mass spectrometry.

Pyrolysis Conditions:
Temperature of the pyrolysis cell: 175° C.
Time of temperature increase: 8 ms
Pyrolysis temperature: 650° C.
Pyrolysis time: 2 s
Pyrolyzed mass: around 0.2 to 0.5 mg Peak areas are recovered, and are then converted into a grafted quantity by means of the calibration curve.

The calibration curve is obtained by analyzing by pyrolysis known amounts of stearic acid. The calibrations follow the same pyrolysis protocol.

The calibration curve obtained is linear.

The fatty acid grafting density is expressed in ng/mg. This amount can be calculated by the following formula:

$$Q = m/M \quad (2)$$

in which:
Q is the amount of reagent in ng per mg of polyvinyl alcohol (ng/mg),
m is the amount of reagent calculated by means of the calibration curve (ng),
M is the weight of polyvinyl alcohol analyzed (mg).

The results obtained are presented in Table 23. They indicate, paradoxically, that the grafted PVAs least effective as barriers are also those that contain the most fatty acids by weight.

TABLE 23

Amount of stearic acid grafted on the PVA (mg/g).

| Type of polyvinyl alcohol | Grafting density (ng/mg) |
|---|---|
| Mowiol 4-88 $C_{18}$ | 975 |
| Mowiol 4-98 $C_{18}$ | 433 |
| Mowiol 28-99 $C_{18}$ | 177 |

The Mowiol 28-99, with respect to the two other types of polyvinyl alcohols, induces good barriers on the papers after grafting, while requiring small amounts of reagent.

9. Influence of the Nature of the Fatty Acid

Palmitic acid chloride (C12) and behenic acid chloride (C22) (Aldric chemical company) were used under the same conditions as the stearic acid chloride. Only the temperature of development of the reaction was modified. A temperature of 130° C. was used for palmitic acid, a temperature of 150° C. was used for stearic acid and a temperature of 180° C. was used for behenic acid.

We performed the grafting, with three acid chlorides, of papers coated with 10 g/m2 of PVA-Mowiol 2899. Given that the grease and gas barrier properties are in fact produced by the PVA layer itself, we simply needed to verify the water barrier, which is produced by grafting after washing with chloroform, by measuring the Cobb 60. Washing with chloroform is important for removing the contribution of compartment I, which could possible form. The results are presented in the table below.

| | Nature of the fatty acid | | | | | |
|---|---|---|---|---|---|---|
| | C16 | | C18 | | C22 | |
| Reaction time (mn) | Cobb 60 (g/m2) | Standard deviation (g/m2) | Cobb 60 (g/m2) | Standard deviation (g/m2) | Cobb 60 (g/m2) | Standard deviation (g/m2) |
| 2 | 2 | 0.8 | 1 | 0.7 | 1 | 0.6 |
| 5 | 1 | 0.6 | 1 | 0.4 | 0 | 0.4 |

The results indicate that the best barrier properties appear to be obtained with the use of longer-chain fatty acids, but this influence is minor.

Similarly, we grafted PVA-Mowiol 28-99 films with three acid chlorides and conducted the analysis thereof by ATR infrared spectrometry always after washing with chloroform. All of the spectra obtained indicate the total disappearance of the OH band at 3400 cm-1. The PVA is therefore, in the three cases, fully grafted on the ATR analysis thickness, i.e. around one micron.

All of the results obtained show that the structure that we have described in FIG. 1 is valid regardless of the nature of the fatty acids that we used.

BIBLIOGRAPHIC REFERENCES

Biver et al., Macromolecules, vol. 35, pages 2552-2559, 2002

Jayaraman K., Shaw Ling Hsu and McCarthy T. J., 2007, "Versatile multilayer thin film preparation using hydrophobic interactions, crystallization and chemical modification of poly(vinyl alcohol)", Langmuir, 23, 3260-3264

Kozlov M. Quarmyne M., C hen W. and McCrthy T. J., 2003 "Adsorption and chemistry of ultra-thin films of polyvinyl alcohol for sensor development", Polymer Science and Engineering, 44(2). 283-284

Freire C. S. R, Silvestre A. J. D., Neto C. P., Belgacem N., Gandini A., 2006, Controlled heterogeneous modification of Cellulose fibers with fatty acids: Effect of reaction conditions on the extent of esterification and fiber properties, J Appl Polym Sci, 100, 1093-1102.

Kwatra H. S., Caruthers J. M., 1992, Synthesis of long chain fatty acids esterified onto cellulose via the vacuum-acid chloride process, Ind. Eng. Chem. Res. 31: 2647-2651.

Mallory W., 1996, Heat sealable multilayer film containing polyvinyl alcohol layer, Patent PCT WO 96/16799.

Nathansohn A., 1930, Procédé fabrication de textiles hydrofuges, Patent 693803.

Vaca Garcia C., Girardeau S., Deschamps G., Nicolas D., Caruel H., Borredon M. E., Gaset A., 2000, Patent PCT WO00/50492.

Vallette P. and Gervason G., 1976, "Amélioration de certaines caractéristiques des complexes par dépôt en surface de produits chimiques", XVI$^e$ Conference—Matériaux composites à base de papier et carton pour l'emballage.

KEY TO THE FIGURES

| FIG. 1 | |
|---|---|
| liaisons hydrogène | hydrogen bonds |
| liaisons hydrophobes | hydrophobic bonds |
| PVA | PVA |
| PVS | PVS |
| Macromolécule de PVA | PVA macromolecule |
| support solide | solid substrate |
| PVSi | PVSi |

| FIGS. 2, 3 | |
|---|---|
| Absorbance | Absorbency |
| Nombre d'onde | Wave number |

| FIG. 3 | |
|---|---|
| Degrée | Degree |
| Après lavage | After washing |
| Durée de traitement (min) | Treatment time (min) |

The invention claimed is:

1. Process for forming a film, having water, grease, gas and water vapor barrier properties, at the surface of a substrate including the following steps:
   coating of the substrate with PVA to form a PVA film at the surface of the substrate, in which the PVA has a molecular weight greater than 13,000 and a degree of hydrolysis greater than 81%;
   drying of the PVA film;
   grafting by esterification in the heterogeneous phase of at least one fatty acid having an aliphatic chain including at least 12 carbon atoms at the surface of the PVA film, wherein the step of grafting is conducted by immersing the PVA film in a solution comprising the at least one fatty acid and an aprotic solvent, evaporating the solvent, and placing the substrate in a ventilated chamber.

2. Process according to claim 1, wherein the substrate is a cellulosic material and the process includes a step of calendaring after the step of drying the PVA film.

3. Process according to claim 1, wherein the coating enables a PVA film with a thickness greater than 0.1 μm to be deposited on the surface of the substrate.

4. Process according to claim 1, wherein the grafting of the fatty acid is performed by esterification in the heterogeneous phase with a fatty acid chloride having an aliphatic chain including at least 12 carbon atoms.

5. Process according to claim 1, wherein the fatty acid is a fatty acid having an aliphatic chain including 16 to 22 carbon atoms.

6. Process according to claim 1, wherein the fatty acid is chosen from the group consisting of stearic acid, palmitic acid and behenic acid.

7. Process according to claim 1, wherein the grafting is performed with stearic acid chloride.

* * * * *